(12) United States Patent
Kim et al.

(10) Patent No.: US 12,537,540 B2
(45) Date of Patent: Jan. 27, 2026

(54) GRAPH DATA COMPRESSION METHOD AND APPARATUS

(71) Applicant: KOREA ADVANCED INSTITUTE OF SCIENCE AND TECHNOLOGY, Daejeon (KR)

(72) Inventors: Min-Soo Kim, Daejeon (KR); Seyeon Oh, Daegu (KR); Donghyoung Han, Daejeon (KR); Inju Na, Daejeon (KR); Sungwoo Park, Daejeon (KR)

(73) Assignee: KOREA ADVANCED INSTITUTE OF SCIENCE AND TECHNOLOGY, Daejeon (KR)

( * ) Notice: Subject to any disclaimer, the term of this patent is extended or adjusted under 35 U.S.C. 154(b) by 234 days.

(21) Appl. No.: 18/463,444

(22) Filed: Sep. 8, 2023

(65) Prior Publication Data

US 2024/0088913 A1 Mar. 14, 2024

(30) Foreign Application Priority Data

Sep. 8, 2022 (KR) .................... 10-2022-0114370
Nov. 28, 2022 (KR) .................... 10-2022-0162046

(51) Int. Cl.
*H03M 7/30* (2006.01)

(52) U.S. Cl.
CPC ....... *H03M 7/3064* (2013.01); *H03M 7/3066* (2013.01)

(58) Field of Classification Search
CPC .... H03M 7/405; H03M 7/707; H03M 7/3064; H03M 7/3066; H03M 7/3082
See application file for complete search history.

(56) References Cited

U.S. PATENT DOCUMENTS

| 8,392,398 | B2 * | 3/2013 | Aggarwal | G06F 16/9024 |
| | | | | 707/750 |
| 2013/0332667 | A1 * | 12/2013 | Uchigaito | G06F 3/0647 |
| | | | | 711/105 |
| 2014/0039902 | A1 * | 2/2014 | Abe | G10L 19/02 |
| | | | | 704/500 |
| 2016/0328822 | A1 * | 11/2016 | Liao | G06T 9/00 |
| 2019/0005384 | A1 * | 1/2019 | Sundar | G06N 3/0455 |
| 2019/0228302 | A1 * | 7/2019 | Saito | G06N 3/08 |
| 2021/0182200 | A1 * | 6/2021 | Liao | G06F 12/0862 |
| 2021/0182285 | A1 * | 6/2021 | Haprian | G06F 16/24561 |
| 2022/0156322 | A1 * | 5/2022 | Singh | G06F 16/9024 |
| 2022/0245147 | A1 * | 8/2022 | Segalini | G06F 16/24552 |
| 2023/0004533 | A1 * | 1/2023 | Valiullin | H03M 7/3077 |
| 2023/0196592 | A1 * | 6/2023 | Ikai | G06V 40/10 |
| | | | | 382/103 |
| 2024/0087076 | A1 * | 3/2024 | Kim | G06T 1/20 |
| 2024/0095305 | A1 * | 3/2024 | Kim | G06F 17/16 |

* cited by examiner

*Primary Examiner* — Lam T Mai
(74) *Attorney, Agent, or Firm* — Kilpatrick Townsend & Stockton LLP

(57) ABSTRACT

Provided are a graph data compression method and apparatus. A computing device divides graph data including information about a source vertex and a destination vertex of an edge into a plurality of pieces, generates a plurality of compressed data obtained by compressing the plurality of pieces, and stores the plurality of compressed data as a file. The computing device may generate a plurality of pieces having a size equal to or less than a predefined data size by recursively dividing graph data.

13 Claims, 14 Drawing Sheets

FIG. 14

| Data set | Size | | | Price (USD/hour) | | |
|---|---|---|---|---|---|---|
| | Edge table | CSR | The disclosure | Edge table | CSR | The disclosure |
| RMAT25 | 6.4GB | 2.4GB | 1.5GB | 0.15 | 0.0 | 0.03 |
| RMAT26 | 12.6GB | 4.7GB | 2.4GB | 0.29 | 0.11 | 0.06 |
| RMAT27 | 25.5GB | 9.6GB | 5.0GB | 0.59 | 0.22 | 0.11 |
| RMAT28 | 50.7GB | 19.1GB | 9.9GB | 1.17 | 0.44 | 0.23 |
| RMAT29 | 101.9GB | 38.3GB | 20.5GB | 2.34 | 0.88 | 0.47 |
| RMAT30 | 203.7GB | 76.5GB | 40.5GB | 4.68 | 1.76 | 0.93 |
| RMAT31 | 407.8GB | 153.1GB | 82.3GB | 9.38 | 3.52 | 1.89 |
| RMAT32 | 823.0GB | 308.7GB | 181.4GB | 18.93 | 7.10 | 4.17 |
| RMAT33 | 3.3GB | 1.2GB | 358.1GB | 75.62 | 28.37 | 8.24 |
| RMAT34 | 6.6GB | 2.5GB | 705.7GB | 150.95 | 56.64 | 16.23 |
| RMAT35 | 13.1GB | 4.9GB | 1.4GB | 301.90 | 113.28 | 31.98 |
| RMAT36 | 26.3GB | 9.9GB | 3.1GB | 603.79 | 226.55 | 70.94 |

GRAPH DATA COMPRESSION METHOD AND APPARATUS

CROSS-REFERENCE TO RELATED APPLICATION

This application is based on and claims priority under 35 U.S.C. § 119 to Korean Patent Application Nos. 10-2022-0114370 and 10-2022-0162046, respectively filed on Sep. 8, 2022 and Nov. 28, 2022, in the Korean Intellectual Property Office, the disclosures of which are incorporated by reference herein in their entirety.

BACKGROUND

1. Field

Embodiments of the disclosure relate to a method and apparatus for compressing graph data.

2. Description of the Related Art

Various types of data may be represented as graphs consisting of vertices and edges. Data from various industries (e.g., a protein-protein-interaction network) such as web pages, social networking service (SNS), communication, finance, and bio/healthcare are related to each other, and a relationship between these data may be represented as a graph consisting of vertices and edges.

As data grows rapidly, the size of a graph representing such data is also increasing. For example, when Facebook is represented as vertices and edges, the number of vertices is 1.3 billion or more and the number of edges is 1 trillion or more. A lot of storage space is required to store such graph data. A lot of storage space is a factor that increases system cost. As a conventional method of compressing and storing graph data, there is a compressed sparse row (CSR) method used in Nvidia's mvGRAPH library, etc. However, because a lot of storage space is still required even when an existing compression method such as CSR is applied, a more efficient compression method is required.

SUMMARY

A technical objective to be achieved by an embodiment of the disclosure is to provide a compression method and apparatus capable of efficiently reducing a storage space of graph data.

Additional aspects will be set forth in part in the description which follows and, in part, will be apparent from the description, or may be learned by practice of the presented embodiments.

According to an embodiment of the disclosure, a graph data compression method by which a computing device including one or more memories, one or more processors, and one or more input/output devices compresses graph data including vertices and edges includes dividing graph data including information about a source vertex and a destination vertex of each edge into a plurality of pieces, generating a plurality of compressed data obtained by compressing the plurality of pieces, and storing the plurality of compressed data.

According to an embodiment of the disclosure, a graph data compression apparatus includes one or more memoirs into which graph data is loaded, and one or more processors configured to generate and store compressed data for the graph data stored in the memory by using a graph compression storage method, wherein the graph data compression storage method includes dividing graph data including information about source vertices and destination vertices of edges into a plurality of pieces, generating a plurality of compressed data obtained by compressing the plurality of pieces, and storing the plurality of compressed data.

BRIEF DESCRIPTION OF THE DRAWINGS

The above and other aspects, features, and advantages of certain embodiments will be more apparent from the following description taken in conjunction with the accompanying drawings, in which:

FIGS. 13 and 14 are graphs obtained after comparing performance of graph data compression methods, according to an embodiment of the disclosure.

DETAILED DESCRIPTION

Figure 1:
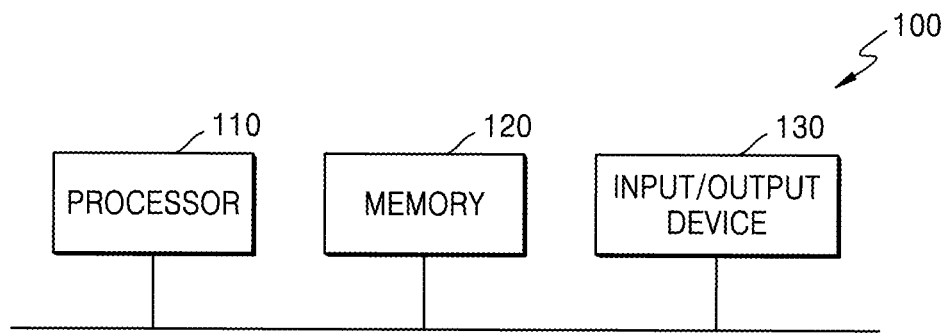
FIG. 1 is a diagram illustrating a computing device for graph data compression, according to an embodiment of the disclosure.

Reference will now be made in detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list.

A graph data compression method and apparatus according to an embodiment of the disclosure will be described in detail with reference to the accompanying drawings.

FIG. 1 is a diagram illustrating a computing device for graph data compression, according to an embodiment of the disclosure.

Referring to FIG. 1, a computing device 100 for processing a graph represented by a plurality of vertices and a plurality of edges includes one or more processors 110, one or more memories 120, and one or more input/output devices 130. In an embodiment, the computing device 100 may further include one or more graphics processing units (GPUs). The present embodiment is only an example for better understanding of the computing device 100, and an embodiment of the disclosure is not necessarily limited to a structure of FIG. 1. Any of various types of devices for storing and processing data may be implemented as the computing device 100 of the present embodiment. Also, each operation performed by the computing device 100 may be implemented by software, may be loaded into the memory 120 (e.g., a main memory or a GPU memory), and then may be performed by the processor 110 (central processing unit (CPU) or GPU).

Figure 2:
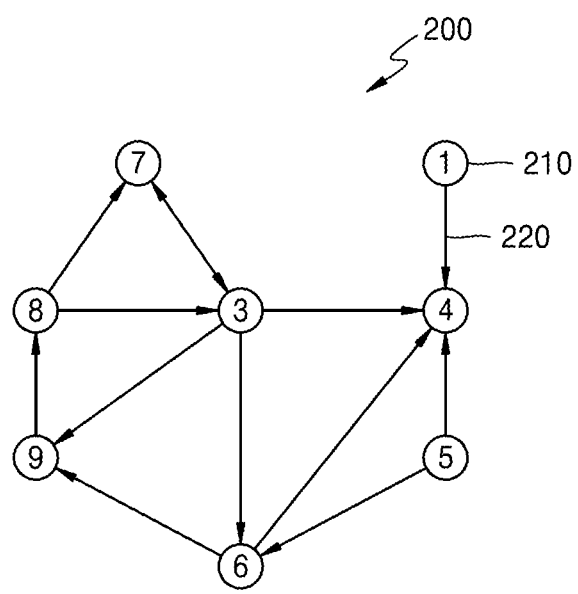
FIG. 2 is a diagram illustrating a graph, according to an embodiment of the disclosure.

FIG. 2 is a diagram illustrating a graph, according to an embodiment of the disclosure.

Referring to FIG. 2, a graph 200 includes a plurality of vertices 210 and a plurality of edges 220. For example, the edge 220 may have a direction or may not have a direction. However, the following will be described based on a directed graph.

Identification information expressed in numbers or characters may be assigned to the vertex 210 existing in the graph 200. For example, numbers that sequentially increase from a predefined number (e.g., 1) may be as identification information assigned to the vertices 210 of the graph 200. In addition, vertex identification information may be displayed in any of various forms such as a mixture of characters and numbers. However, the following will be described assuming that numbers that sequentially increase are assigned as identification information to the vertices 210 of the graph 200.

Information about a source vertex Vi and a destination vertex Vj of the edge 220 of the graph 200 may be represented in the format of (Vi, Vj). In addition, the graph 200 may be represented in any of various formats, and an example is shown in FIG. 3.

Figure 3:
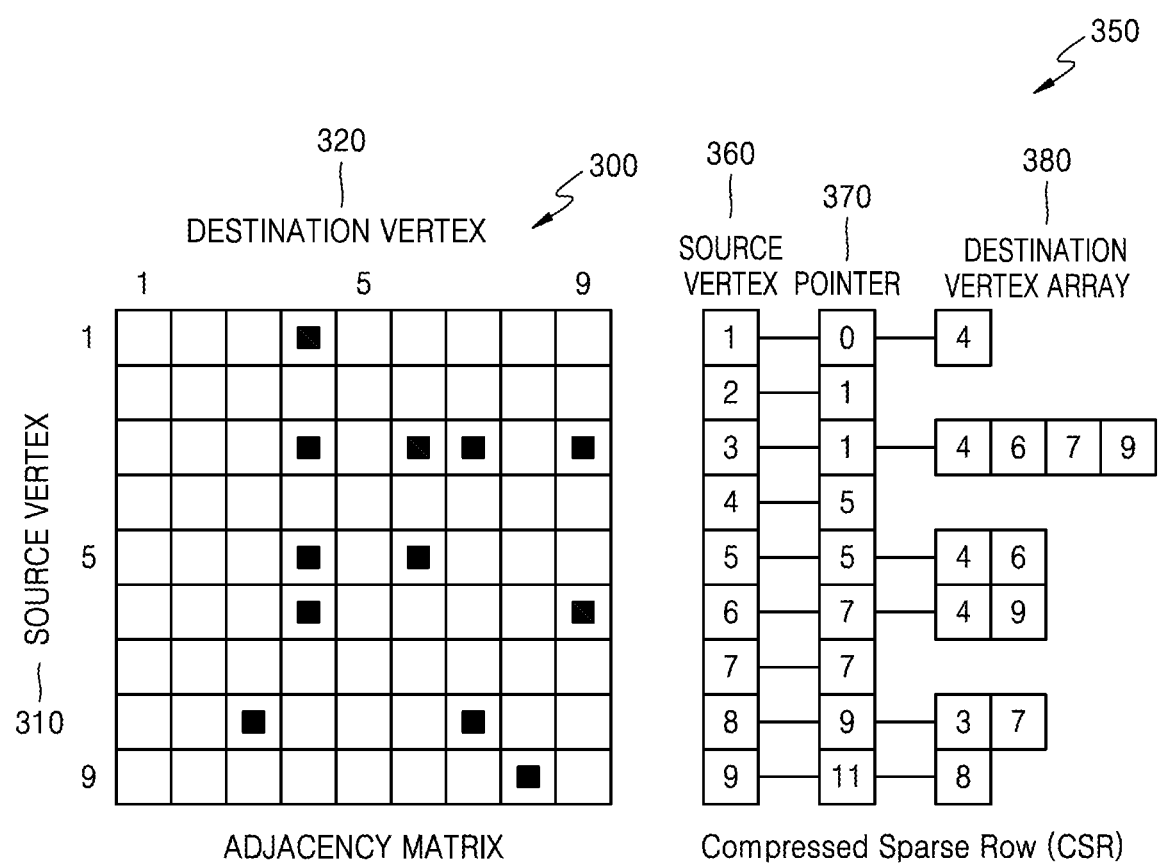
FIG. 3 is a diagram illustrating a format of graph data, according to an embodiment of the disclosure.

FIG. 3 is a diagram illustrating a format of graph data, according to an embodiment of the disclosure.

Referring to FIG. 3, graph data may be represented in the format of an adjacency matrix 300 in which source vertices 310 and destination vertices 320 of edges are expressed in rows and columns. For example, when there is an edge directed from vertex 1 to vertex 4, the edge may be expressed as a predefined value (e.g., '1') at (1, 4) of the adjacency matrix 300. Also, a portion of the adjacency matrix 300 where no edge exists may be expressed as a predefined value (e.g., '0'). For better understanding, in the present embodiment, an element with an edge in the adjacency matrix 300 is displayed as a square box, and an element with no edge is displayed as an empty space.

In another embodiment, graph data may be represented in a CSR format 350. The CSR format 350 includes a source vertex array 360 and a destination vertex array 380 of each edge, and a pointer 370 indicating a relationship between a source vertex and a destination vertex. The CSR format 350 is already widely known, and thus, an additional description thereof will be omitted.

The adjacency matrix 300 or the CSR format 350 is merely an example of representing graph data, and an embodiment of the disclosure is not necessarily limited thereto. However, for convenience of explanation, the following will be described assuming that graph data is represented in the format of the adjacency matrix 300.

Figure 4:
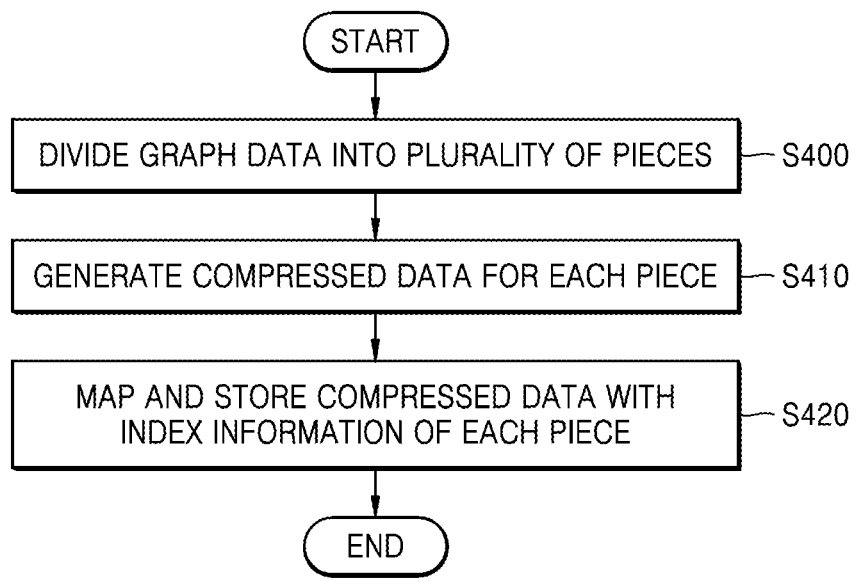
FIG. 4 is a flowchart illustrating a graph data compression method, according to an embodiment of the disclosure.

FIG. 4 is a flowchart illustrating a graph data compression method, according to an embodiment of the disclosure.

Figure 5:
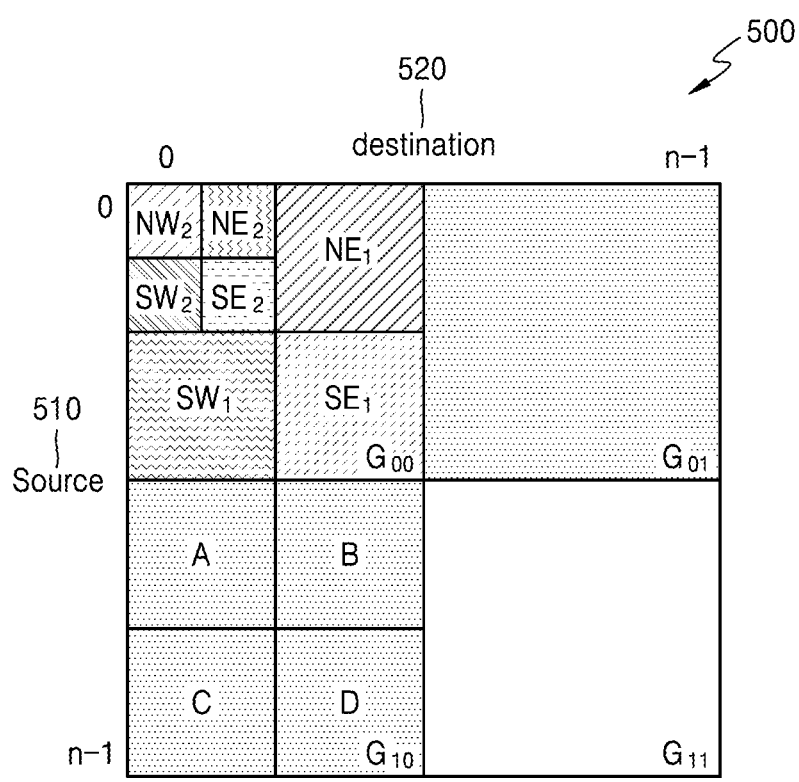
FIG. 5 is a diagram illustrating a method of dividing graph data, according to an embodiment of the disclosure.

Referring to FIG. 4, the computing device 100 divides graph data including information about a source vertex and a destination vertex of each edge into a plurality of pieces (S400). In an embodiment, the computing device 100 may divide graph data into a plurality of pieces based on a source vertex and/or a destination vertex. For example, when graph data is represented as the adjacency matrix 300 of FIG. 3, the computing device 100 may recursively divide the adjacency matrix 300 to generate a plurality of pieces having a size equal to or less than a predefined data size. A size of each piece may be equal to or less than a size that may be loaded into a memory (a main memory or a GPU memory). An example of a method of dividing the adjacency matrix 300 into a plurality of pieces is illustrated in FIG. 5.

The computing device 100 generates a plurality of compressed data obtained by compressing the plurality of pieces (S410). The computing device 100 may perform a compression process in units of pieces. For example, when graph data is divided into N pieces, the computing device 100 compresses each of the N pieces. In other words, because a process of compressing each piece does not affect processes of compressing surrounding pieces, the computing device 100 may perform processes of compressing the N pieces in a parallel or distributed manner, thereby reducing a time required for a compression process. Alternatively, the computing device 100 may sequentially perform N compression processes.

The computing device 100 may apply any of various conventional compression methods such as CSR to each piece. However, because a size of compressed data obtained by applying an existing compression method is not sufficiently small, the present embodiment proposes a method of compressing graph data to a smaller size. A detailed method of compressing graph data will be described below with reference to FIGS. 6 to 11.

The computing device 100 stores a plurality of compressed data generated by compressing the pieces (S420). The computing device 100 may store the plurality of compressed data for the plurality of pieces as a single file or as individual files. In an embodiment, when the plurality of compressed data for the plurality of pieces are stored as a single file, the computing device 100 may map and store index information for each piece with the plurality of compressed data in order to speed up access to compressed data of each piece in the file. The index information about the compressed data may be stored in any of various formats. An example of storing index information about each piece in a tree structure will be described below with reference to FIG. 6.

FIG. 5 is a diagram illustrating a method of dividing graph data, according to an embodiment of the disclosure.

Referring to FIG. 5, the computing device 100 may receive an adjacency matrix 500 in which a source vertex 510 and a destination vertex 520 of an edge are represented as a matrix. In another embodiment, when the computing device 100 receives graph data represented in various formats, the computing device 100 may convert the graph data into a format of the adjacency matrix 500 and may store the same.

The computing device 100 recursively divides the adjacency matrix 500. A result obtained when the computing device 100 recursively quarters the adjacency matrix 500 is illustrated in the present embodiment. A recursive division process will be described in detail. The computing device 100 quarters the adjacency matrix 500 to generate four blocks ($G_{00}$, $G_{01}$, $G_{10}$, and $G_{11}$). When there is no edge in the $G_{01}$ and $G_{11}$ blocks or a data size of edges (i.e., the number of edges) existing in the $G_{01}$ and $G_{11}$ blocks is equal to or less than a predefined size (e.g., a size that may be loaded into a memory (a main memory or a GPU memory), additional division is not performed on the $G_{01}$ and $G_{11}$ blocks. Here, a size of a block and a data size of edges existing in a block are different from each other. While a size of a block is a "horizontal size of a block*a vertical size of the block*a data size of matrix elements", a data size existing a block is "the number of matrix elements with edges*a data size of matrix elements".

The computing device further quarters the $G_{00}$ and $G_{10}$ blocks A data size of edges (i.e., the number of edges) existing in each of sub-blocks A, B, C, and D generated by quartering the $G_{10}$ block is equal to or less than a predefined size, a division process on each of the sub-blocks A, B, C, and D ends.

When a data size of edges existing in any one of four sub-blocks of the $G_{00}$ block exceeds a predefined size, the computing device 100 further divides the sub-block to generate four other sub-blocks $NW_2$, $NE_2$, $SW_2$, and $SE_2$.

In this way, the computing device 100 may repeatedly perform a recursive division process until a data size of edges (i.e., the number of edges) existing in a block and/or a sub-block is equal to or less than a predefined size. Hereinafter, a final block (or sub-block) generated through recursive division will be referred to as a 'piece'. Pieces generated by dividing the adjacency matrix 500 of the present embodiment are $G_{01}$, $G_{11}$, A, B, C, D, $NE_1$, $SW_1$, $SE_1$, $NW_2$, $NE_2$, $SW_2$, and $SE_2$. Sizes of a plurality of pieces generated by dividing graph data may be different from each other.

Figure 6:
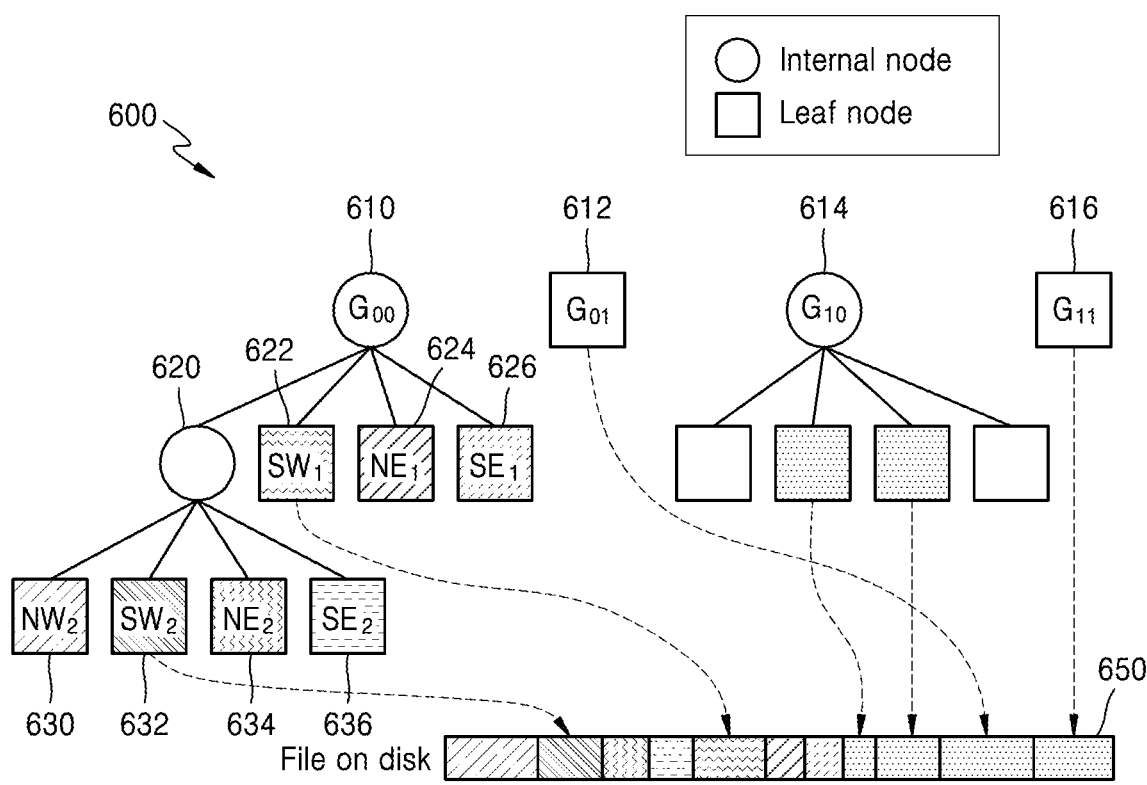
FIG. 6 is a diagram illustrating a method of storing index information about a piece of graph data, according to an embodiment of the disclosure.

FIG. 6 is a diagram illustrating a method of storing index information about a piece of graph data, according to an embodiment of the disclosure.

Referring to FIG. 6, the computing device 100 may store index information about a plurality of pieces generated by dividing graph data in a tree structure 600. When a plurality of pieces are generated by recursively dividing graph data, the computing device 100 may store index information about each piece in leaf nodes 630, 632, 622, and 612 of the tree structure 600 having a depth proportional to the number of recursive divisions. For example, when pieces are generated by performing a process of recursively dividing the adjacency matrix 500 of FIG. 5 three times, the computing device 100 may store index information by using a quad tree structure 600 having a depth of 3.

A process of generating a tree structure for storing index information will be described based on a process of dividing the adjacency matrix of FIG. 5 into a plurality of pieces. First, the computing device 100 generates four nodes 610, 612, 614, and 616 corresponding to the $G_{00}$, $G_{01}$, $G_{10}$, and $G_{11}$ blocks generated through first division under a root node (not shown). Because the $G_{01}$ and $G_{11}$ blocks themselves become pieces without additional division, the computing device 100 stores index information about the $G_{01}$ and $G_{11}$ blocks (i.e., pieces) in the $G_{01}$ node 612 and the $G_{11}$ node 616.

The $G_{00}$ and $G_{10}$ blocks are further quartered, and the computing device 100 generates nodes of four sub-blocks generated by quartering the $G_{00}$ and $G_{10}$ blocks as lower-level nodes of the $G_{00}$ node 610 and the $G_{10}$ node 612. That is, four sub-nodes 620, 622, 624, and 626 exist in the $G_{00}$ node 610.

One sub-block of the Go block is further quartered, and the computing device 100 generates four lower-level nodes 630, 632, 634, and 636 respectively corresponding to the divided four sub-blocks $NW_2$, $SW_2$, $NE_2$, and $SE_2$. In this way, the computing device 100 may generate a node corresponding to each piece.

The computing device 100 stores index information corresponding to each piece in leaf nodes 630, 632, 634, 636, 622, 624, 626, 612, and 616 of the tree structure 600. For example, when the computing device 100 generates compressed data of each piece and stores the compressed data as a file 650, the computing device 100 may store index information indicating a position of the compressed data of each piece within the file in a leaf node of the tree structure 600.

Figure 7:
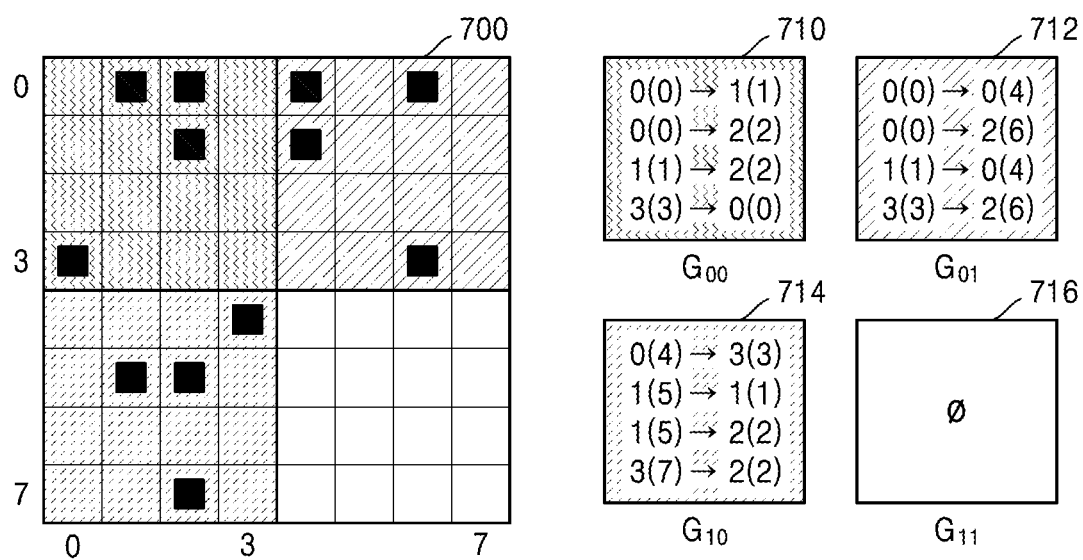
FIGS. 7 and 8 are diagrams illustrating a method of generating compressed data in units of pieces, according to an embodiment of the disclosure.
Figure 8:
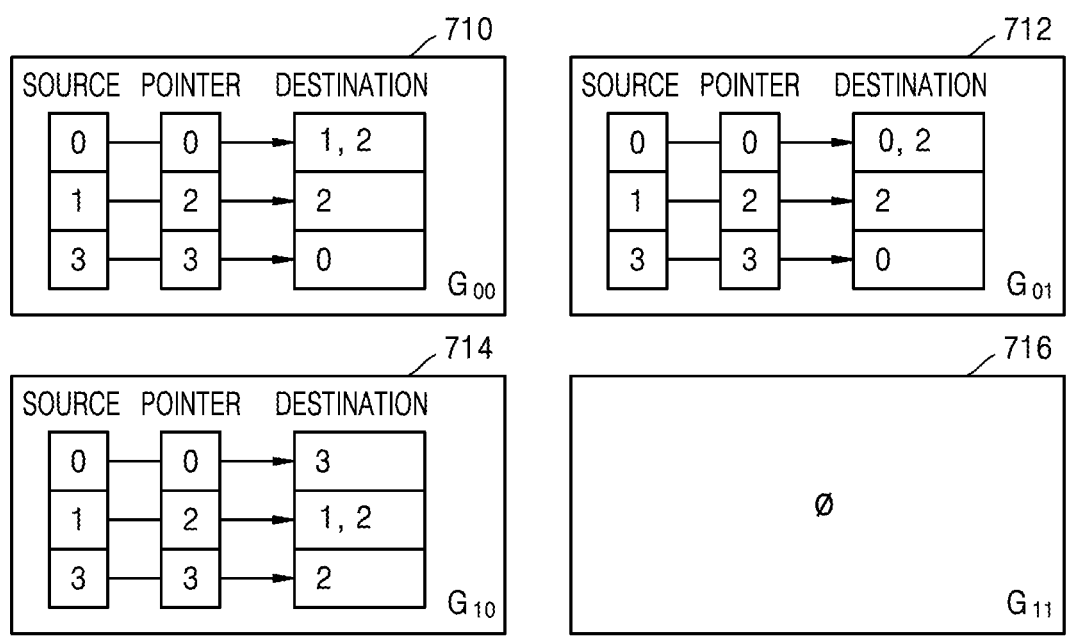

FIGS. 7 and 8 are diagrams illustrating a method of generating compressed data in units of pieces, according to an embodiment of the disclosure.

Referring to FIGS. 7 and 8 together, an edge of a graph may be expressed by a source vertex and a destination vertex. Identification information may be assigned to each vertex as described with reference to FIG. 2. When a graph includes 1 trillion edges, graph identification information indicating vertices of the graph should be defined as a data type of at least 8 bytes.

The computing device 100 may generate compressed data with a reduced data size by converting identification information of vertices existing in a piece. Identification information for distinguishing each vertex within the entire graph is referred to as 'global identification information'. For better understanding, in the present embodiment, a graph having eight vertices is represented as an adjacency matrix 700. Global identification information of each vertex is a value between 0 and 7.

The computing device 100 divides the adjacency matrix 700 into a plurality of pieces 710, 712, 714, and 716. The present embodiment will be described assuming that the adjacency matrix 700 is divided into four pieces. The computing device 100 converts global identification information of vertices for each piece into identification information (hereinafter, referred to as local identification information) that sequentially increases within each piece. When a size of a piece is an N*N matrix, the computing device may convert global identification information of vertices existing in each piece into local identification information of 0 to (N−1).

For example, in the $G_{00}$ piece 710, there are source vertices having global identification information of 0 to 3 and destination vertices having global identification information (numbers in parentheses) of 0 to 3. The computing device 100 converts global identification information of the $G_{00}$ piece 710 into local identification information of 0 to 3. In the case of the $G_{00}$ piece 710, because global identification information and local identification information are the same, four pieces of edge information existing in the $G_{00}$ piece 710 are expressed as (0,1), (0,2), (1,2), and (3,0) as before.

In the $G_{01}$ piece 712, there are source vertices having global identification information of 0 to 3 and destination vertices having global identification information of 4 to 7. The computing device 100 converts all global identification information of the $G_{01}$ piece 712 into local identification information of 0 to 3. Accordingly, information of edges (source vertex and destination vertex) existing as global identification information in the $G_{01}$ piece 712 is converted from (0,4), (0,6), (1,4), and (3,6) into (0,0), (0,2), (1,0), and (3,2).

The computing device 100 also converts information of edges existing in the $G_{10}$ piece 714 into local identification information. The computing device 100 may not perform a separate conversion process on the $G_{11}$ piece 716 with no edge. That is, because vertex information of the $G_{11}$ piece 716 with no edge is not stored, a storage space of graph data may be minimized.

The computing device 100 may store compressed data obtained by converting information of edges of the pieces 710, 712, 714, and 716 into local identification information by using the method of FIG. 6 or the like. When the number of edges is 1 trillion or more, an 8-byte data type is required to store global identification information of vertices. However, according to the present embodiment, because a graph is divided into pieces having a certain size or less (*e.g., $2^{24}*2^{24}$ edges or less), a 3-byte data type is required to store local identification information. That is, while 8 bytes were required to represent one vertex in order to store graph data, the present embodiment may represent one vertex by using 3 bytes, thereby saving a 5-byte storage space per vertex.

In an embodiment, the computing device 100 may store edge information of each piece obtained by converting global identification information into local identification information in the form of a source vertex and a destination vertex as shown in FIG. 7 or in a CSR format as shown in FIG. 8. In addition, edge information of each piece expressed as local identification information may be stored in any of various formats, and an embodiment of the disclosure is not limited to the examples of FIGS. 7 and 8. A range of local identification information of each piece may be set in various ways according to embodiments.

Figure 9:
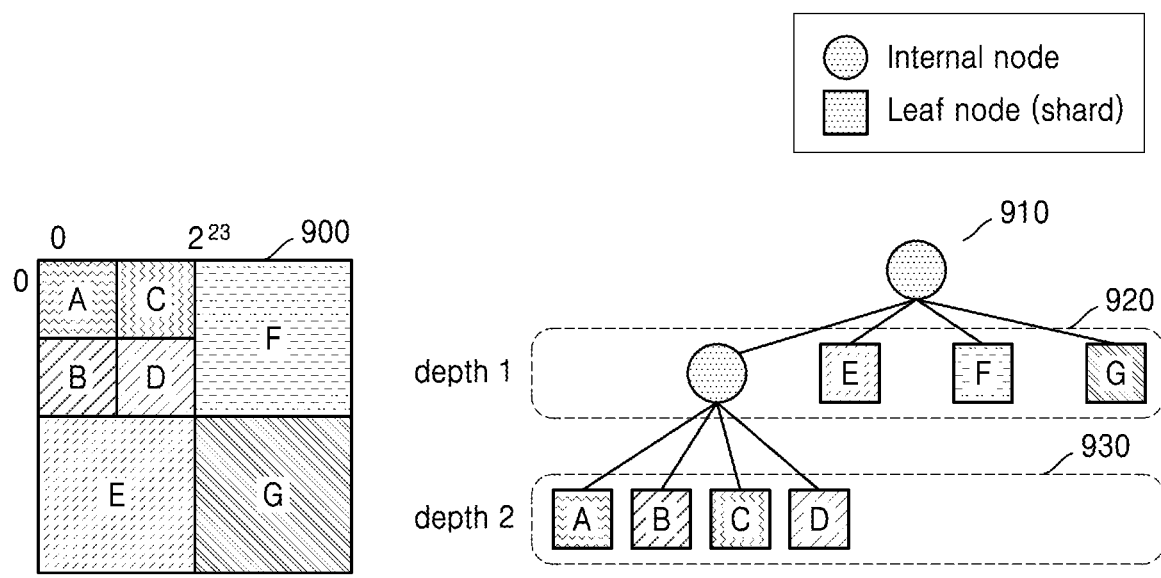
FIGS. 9 and 10 are diagrams illustrating a method of generating compressed data in units of pieces, according to another embodiment of the disclosure.
Figure 10:
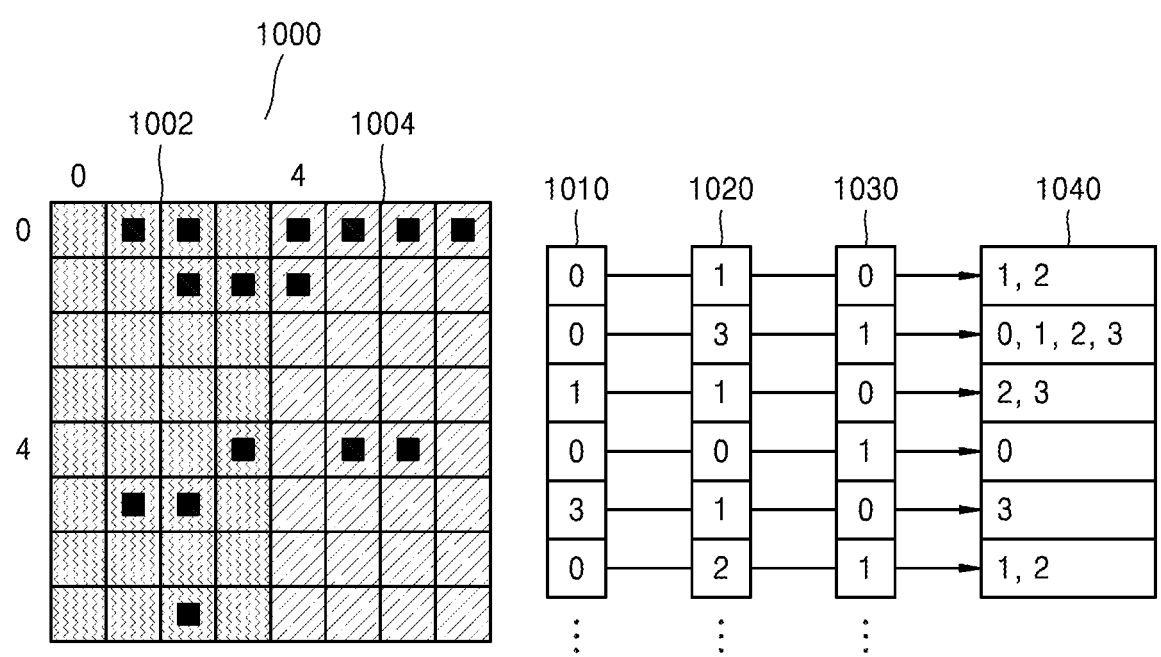

FIGS. 9 and 10 are diagrams illustrating a method of generating compressed data in units of pieces, according to another embodiment of the disclosure.

Referring to FIG. 9, the computing device 100 divides an adjacency matrix 900 to generate a plurality of pieces. In the present embodiment, there are seven pieces (A, B, C, D, E, F, and G). The computing device 100 stores index information about the seven pieces in a tree structure 910 by using the method described with reference to FIG. 6. A node corresponding to each piece generated through first division exists at a first depth 920 of the tree structure 910, and a node corresponding to each piece generated through second division exists at a second depth 930.

The computing device 100 performs a compression process on each of the seven pieces. For example, the computing device 100 may perform a compression process on each of the 7 pieces in total, such as a compression process on the A piece and a compression process on the B piece.

Referring to FIG. 10, an example of a method of generating compressed data for a piece is illustrated. For convenience of explanation, the present embodiment will be described assuming that a size of the A piece of FIG. 9 is 8*8. Also, it is assumed that identification information of a source vertex and a destination vertex of a piece is a value between 0 and 7. In this case, the identification information of the vertex may be unique global identification information in the graph or unique local identification information in each piece as described with reference to FIG. 7.

The computing device 100 may divide a piece 1000 including information of a source vertex and a destination vertex of an edge into two or more groups (1002 and 1004). In another embodiment, the computing device 100 may generate compressed data from the piece 1000 itself without dividing the piece 1000 into groups, or may divide the piece 1000 into groups in units of columns. For example, the computing device 100 may divide eight columns into eight groups. However, for convenience of explanation, an example in which the piece 1000 is divided into two groups (1002 and 1004) in a column direction is illustrated. That is, a first group 1002 includes first to fourth columns from among a total of eight columns in the piece 1000, and a second group 1004 includes fifth to eighth columns. The number of groups may be three or more and vary according to embodiments.

The computing device 100 may generate compressed data in units of groups. For example, for each of the first and second groups 1002 and 1004, the computing device 100 generates compressed data including first information 1010 indicating a difference in identification information of each source vertex from an immediately previous source vertex, second information 1020 indicating the number of edges for each source vertex, third information 1030 indicating groups to which destination vertices of edges for each source vertex belongs, and fourth information 1040 indicating destination vertices of edges for each source vertex. That is, compressed data includes data elements including first to fourth information.

In detail, first, the computing device 100 generates first to fourth information about a source vertex '0' of the first group 1002 of the piece 1000. Because the source vertex '0' is a first row in the piece 1000, the computing device 100 generates '0' as the first information 1010. A start value of the first information 1010 may be modified in various ways according to embodiments.

Because the number of edges existing at the source vertex '0' in the first group 1002 is 2, the computing device 100 generates '1' (=number of edges−1) as the second information 1020. Although a value obtained by subtracting 1 from the number of edges is used as the second information 1020 in order to use a bit value '0' when expressing the number of edges in the present embodiment, this is merely an example and a method of expressing the second information 1020 may be modified in various ways according to embodiments.

When identifiers of the first group 1002 and the second group 1004 are respectively '0' and '1', the third information 1030 is '0'. Because identification information of destination vertices of edges connected to the source vertex '0' in the first group 1002 is '1' and '2', the fourth information 1040 is '1,2'. In summary, the first to fourth information of the source vertex '0' of the first group 1002 are respectively '0', '1', '0', and '1,2'. A group identifier may be set to various values according to embodiments.

When the first to fourth information of the first group 1002 for the source vertex '0' is generated, next, the computing device 100 generates first to fourth information of the second group 1004 for a source vertex '0'. Because the source vertex '0' of the second group 1004 has the same identification information as the source vertex '0' of the first group that is previously obtained, the first information 1010 for the source vertex '0' of the second group 1004 is '0'. Destination vertex identification information of the second group 1004 is 4 to 7. Accordingly, the fourth information 1040 may be expressed as '4,5,6,7'. In another embodiment, the computing device may convert identification information of a destination vertex into unique local identification information in a group and may store the local identification information. In other words, the computing device may convert the identification information of 4 to 7 of the second group 1004 into local identification information of 0 to 3 to reduce a data size required to store identification information of each vertex. The following will be described assuming that identification information of the fourth information 1040 is converted into local identification information and the local identification information is stored. In summary, the first to fourth information 1010, 1020, 1030, and 1040 for the source vertex '0' of the second group 1004 is '0', '3', '1', and '0,1,2,3'.

When the first to fourth information 1010, 1020, 1030, and 1040 of a source vertex '1' located in a second row of the first group 1002 is obtained in this way, '1', '1', '0', '2, and '3' are obtained. Because the source vertex '1' has a difference of '1' from the source vertex '0' of the previously obtained compressed data, the first information 1010 is '1'. The first to fourth information 1010, 1020, 1030, and 104 for the source vertex '1' of the second group 1004 of the second row is '0', '0', '1', and '0'.

Because there are no edges in third and fourth rows of the piece 1000, the computing device 100 generates first to fourth information for a source vertex '4' of the first group 1002 of a fifth row. Because a difference in identification information between the source vertex '4' and the source vertex '1' of the previously stored compressed data is '3', the first information 1010 is '3'.

The present embodiment proposes a method of generating compressed data including first to fourth information based on a source vertex. For example, the computing device generates the first to fourth information 1010, 1020, 1030, and 1040 of the first group 1002 for the source vertex '0' and then generates the first to fourth information 1010, 1020, 1030, and 1040 of the second group 1004. However, this is merely an example, and an order of generating the first to fourth information 1010, 1020, 1030, and 1040 for a plurality of edges existing in the piece 1000 may be modified in various ways and is not limited to the present embodiment.

In another embodiment, when the piece 1000 is not divided into groups, third information indicating identification information of a group may be omitted. In another embodiment, when the piece 1000 is divided into groups in units of columns, second information and fourth information may be omitted.

The computing device 100 generates the first to fourth information 1010, 1020, 1030, and 1040 obtained for each source vertex of an edge in the piece 1000 as compressed data of the piece 1000. In an embodiment, the computing device 100 may store the first to fourth information 1010, 1020, 1030, and 1040 as vectors. That is, the first information 1010 may be stored as a first vector, the second information 1020 may be stored as a second vector, the third information 1030 may be stored as a third vector, and the fourth information 1040 may be stored as a fourth vector.

The computing device 100 may minimize a size of compressed data of the piece 1000 by minimizing a data size for storing information of the first to fourth information 1010, 1020, 1030, and 1040, which will be described with reference to FIG. 11.

Figure 11:
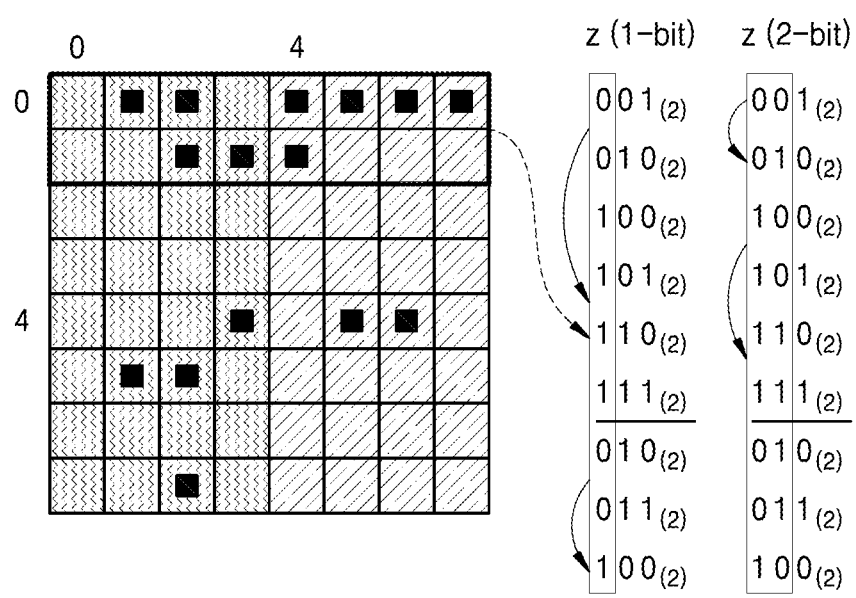
FIG. 11 is a diagram illustrating a method of minimizing a size of compressed data, according to an embodiment of the disclosure.

FIG. 11 is a diagram illustrating a method of minimizing a size of compressed data, according to an embodiment of the disclosure.

Referring to FIGS. 10 and 11 together, the computing device 100 may determine a data size z representing the third information 1030 and a data size y representing the fourth information 1040 according to a size of the piece 1000.

For example, the computing device 100 may determine that a sum (y+z) of the data size representing the third information 1030 and the data size representing the fourth information 1040 is "$\log_2$ (the number of source vertices or destination vertices in the piece)". Because a size of the piece 1000 is $2^3 * 2^3$ in the present embodiment, the number of destination vertices in the piece is $2^3$, and thus, y+z=3. A combination of y and z that satisfies y+z=3 is (0,3), (1,2), (2,1), or (3,0). That is, when y includes 1 bit, z becomes 2 bits. Alternatively, when y includes 2 bits, z becomes 1 bit. When the piece 1000 is not divided into groups, z=0 bit. In another embodiment, when the piece 1000 is divided into groups in units of columns, y=0 bit.

When z is determined to be 1 bit, the number of cases that may be expressed by z is 2, and thus, the computing device 100 may divide the piece 1000 into two groups, may distinguish the groups as '0' and '1', and may store the groups in the third information 1030 of 1 bit. Because y is 2 bits, the computing device 100 may distinguish four destination vertices existing in each group as '00', '01', '10', and '11' and may store the destination vertices in the fourth information 1040. For example, when the third information 1030 and the fourth information 1040 of six edges of a first row in the piece 1000 are expressed in a total of 3 bits (the third information of 1 bit+the fourth information of 2 bits), '001', '010', '100', '101', '110', and '111' are obtained.

When z is determined to be 2 bits, because the number of cases that may be expressed by z is 4, the computing device 100 may divide the piece 1000 into four groups, may distinguish the groups as '00', '01', '10', and '11', and may store the groups in the third information 1030 of 2 bits. That is, a first group includes first and second columns, a second group includes third and fourth columns, a third group includes fifth and sixth columns, and a fourth group includes seventh and eighth columns. First to fourth information of each edge of each group may be obtained by using the method of FIG. 10. For example, the third information 1030 about an edge of the first group of a first row of the piece 1000 is '00', and the fourth information 1040 is '1'. Accordingly, when z is 2 bits and y is 1 bit, and the third information 1030 and the fourth information 1040 of six edges of the first row are expressed in 3 bits, '001', '010', '100', '101', '110', and '111' are obtained.

In another embodiment, because the second information 1020 is the number of edges for each source vertex in a group, the computing device 100 may make a data size of the second information 1020 of compressed data equal to a data size of the fourth information 1040. That is, when y is 2 bits, a size of the second information 1020 may be determined to be 2 bits.

In another embodiment, the computing device 100 may determine a data size x of the first information 1010 according to the number of rows with no edge in the piece 1000. Because rows with no edge in the piece 1000 are third and fourth rows in the present embodiment, a largest value stored in the first information 1010 is '3'. Because the minimum number of bits for representing 3 is 2 bits, the computing device 100 may determine a size of the first information 1010 to be 2 bits.

Accordingly, a data size required for compressed data to store information of an edge existing in one row of each group in the piece 1000 is x+y+z+y*(the number of destination vertices) bits. Because x is 2 bits and y+z is 3 bits in the present embodiment, when y is determined to be 1 bit, the computing device 100 may generate compressed data for storing edge information for each row of each group of a piece with a total data size of 6 bits. When y is determined to be 2 bits, a data size required to store edge information of each row of each group is 7 bits.

Figure 12:
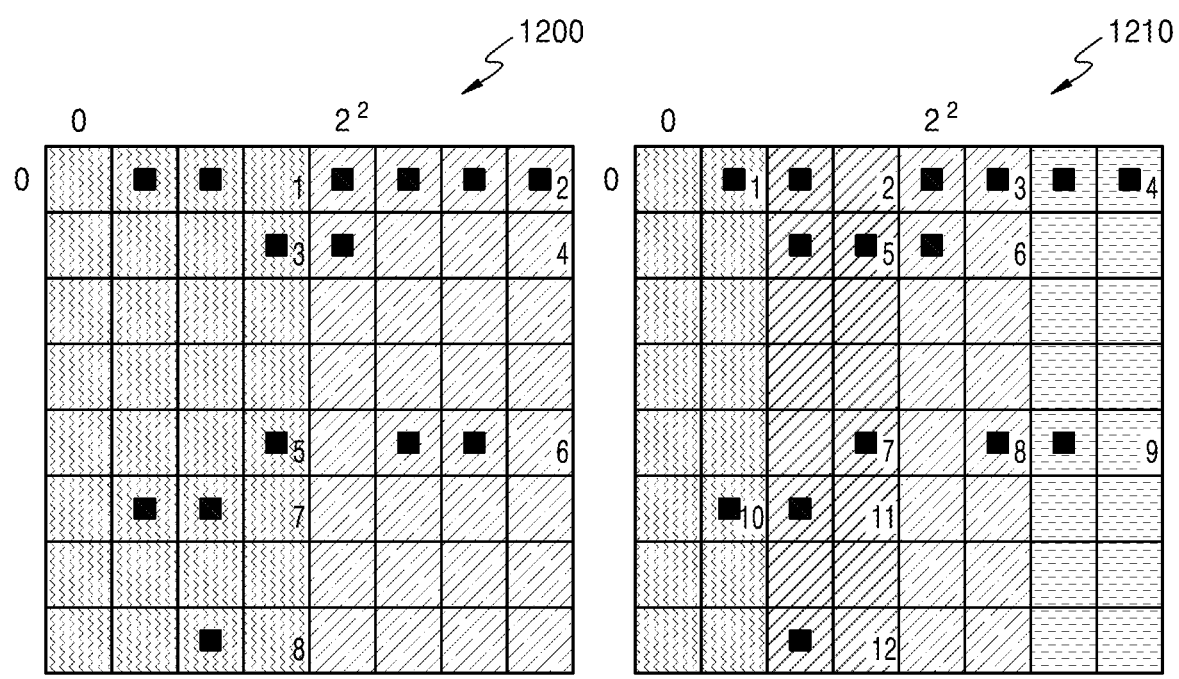
FIG. 12 is a diagram illustrating a method of minimizing a size of compressed data, according to another embodiment of the disclosure.

FIG. 12 is a diagram illustrating a method of minimizing a size of compressed data, according to another embodiment of the disclosure.

Referring to FIG. 12, the computing device 100 may determine y and z so that "a data size y representing the fourth information*(the number of vertices in a piece+1)+a sum (x+y+z) of data sizes representing the first to third information*the number r of data elements of compressed data" is minimized. The number of data elements of compressed data is the number of elements including the first to fourth information.

When a piece 1200 is divided into 2 groups, the number r of data elements of compressed data is 8 in total, and when a piece 1210 is divided into 4 groups, the number r of data elements of compressed data is 12 in total. Because x is determined by a maximum interval of rows with no edge in a piece and the number r of data elements of compressed data is determined by the number of groups in the piece, the computing device may minimize a size of compressed data by obtaining a combination of y and z where "a data size y representing the fourth information*(the number of vertices in the piece+1)+a sum (x+y+z) of data sizes representing the first to third information*the number r of data elements of compressed data" is minimized.

Figure 13:
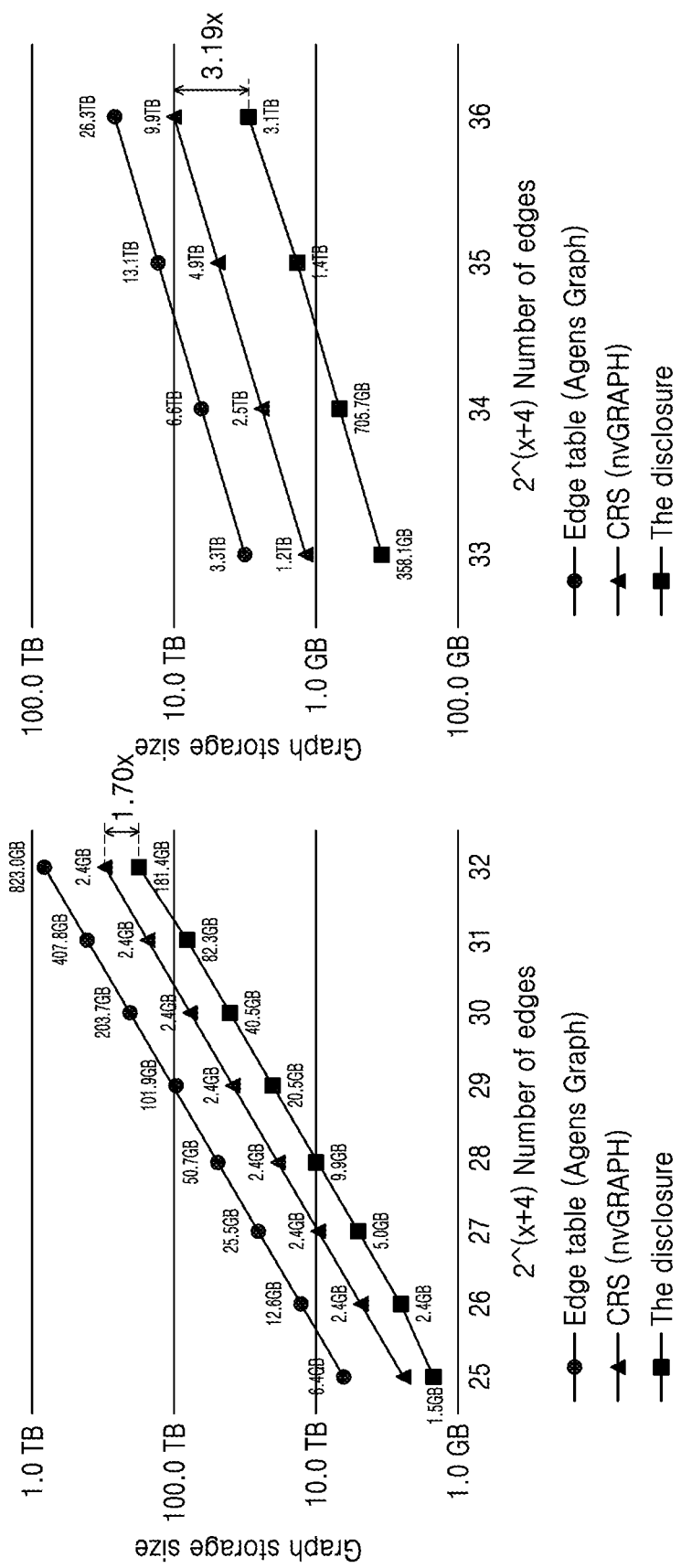

FIGS. 13 and 14 are graphs obtained after comparing performance of graph data compression methods, according to an embodiment of the disclosure.

Referring to FIGS. 13 and 14, it is found that a compression method of the disclosure may save more storage space for graph data than conventional compression methods.

The disclosure may also be embodied as computer-readable code on a computer-readable recording medium. The computer-readable recording medium includes any data storage device that may store data which may be thereafter read by a computer system. Examples of the computer-readable recording medium include a read-only memory (ROM), a random-access memory (RAM), a compact disk (CD)-ROM, a magnetic tape, a floppy disk, and an optical data storage device. The computer-readable recording medium may also be distributed over network-coupled computer systems so that the computer-readable code is stored and executed in a distributive manner.

According to an embodiment of the disclosure, compared to a conventional compression algorithm such as CSR, graph data may be compressed and stored in a smaller size. According to another embodiment, compressed and stored graph data may be rapidly retrieved.

It should be understood that embodiments described herein should be considered in a descriptive sense only and not for purposes of limitation. Descriptions of features or aspects within each embodiment should typically be considered as available for other similar features or aspects in other embodiments. While one or more embodiments have been described with reference to the figures, it will be understood by one of ordinary skill in the art that various changes in form and details may be made therein without departing from the spirit and scope of the disclosure as defined by the following claims.

What is claimed is:

1. A graph data compression method by which computing device comprising one or more memories, one or more processors, and one or more input/output devices compress graph data comprising vertices and edges, the graph data compression method comprising:
dividing graph data comprising information about a source vertex and a destination vertex of each edge into a plurality of pieces;
generating a plurality of compressed data obtained by compressing the plurality of pieces; and
storing the plurality of compressed data,
wherein the dividing comprises recursively dividing the graph data to generate a plurality of pieces having a size equal to or less than a predefined data size.

2. A computer-readable recording medium having recorded thereon a computer program for performing the graph data compression method of claim 1.

3. A graph data compression method by which computing device comprising one or more memories, one or more processors, and one or more input/output devices compress graph data comprising vertices and edges, the graph data compression method comprising:
dividing graph data comprising information about a source vertex and a destination vertex of each edge into a plurality of pieces;
generating a plurality of compressed data obtained by compressing the plurality of pieces; and
storing the plurality of compressed data,
wherein the graph data is an adjacency matrix in which source vertices and destination vertices of edges are represented as a matrix,
wherein the dividing comprises recursively dividing the adjacency matrix until a number of edges included in each piece is equal to or less than a predefined number.

4. The graph data compression method of claim 3, wherein the generating the plurality of compressed data comprises generating compressed data except for pieces with no information about an edge from among a plurality of pieces generated by dividing the adjacency matrix.

5. A graph data compression method by which computing device comprising one or more memories, one or more processors, and one or more input/output devices compress graph data comprising vertices and edges, the graph data compression method comprising:
dividing graph data comprising information about a source vertex and a destination vertex of each edge into a plurality of pieces;
generating a plurality of compressed data obtained by compressing the plurality of pieces; and
storing the plurality of compressed data,
wherein the storing comprises mapping and storing the plurality of compressed data with index information of each piece.

6. The graph data compression method of claim 5, wherein
the dividing comprises recursively dividing the graph data to generate a plurality of pieces having a size equal to or less than a predefined data size, and
the storing comprises storing index information about the plurality of pieces in leaf nodes by using a tree structure having a depth proportional to a number of recursive divisions.

7. A graph data compression method by which computing device comprising one or more memories, one or more processors, and one or more input/output devices compress graph data comprising vertices and edges, the graph data compression method comprising:
dividing graph data comprising information about a source vertex and a destination vertex of each edge into a plurality of pieces;
generating a plurality of compressed data obtained by compressing the plurality of pieces; and
storing the plurality of compressed data,
wherein the generating of the plurality of compressed data comprises:
for each piece,
converting global identification information indicating vertices of the graph data into local identification information that sequentially increases within the piece; and generating compressed data representing source vertices and destination vertices of edges by using the local identification information.

8. A graph data compression method by which computing device comprising one or more memories, one or more processors, and one or more input/output devices compress graph data comprising vertices and edges, the graph data compression method comprising:

dividing graph data comprising information about a source vertex and a destination vertex of each edge into a plurality of pieces;

generating a plurality of compressed data obtained by compressing the plurality of pieces; and storing the plurality of compressed data, wherein the generating of the plurality of compressed data comprises:

dividing a piece comprising source vertices and destination vertices of edges into two or more groups; and for each group, generating compressed data comprising first information indicating a difference between identification information of each source vertex from an immediately previous source vertex, second information indicating a number of edges for each source vertex, third information indicating groups to which destination vertices of edges for each source vertex belongs, and fourth information indicating destination vertices of edges for each source vertex.

9. The graph data compression method of claim 8, wherein the fourth information is local identification information given to distinguish destination vertices within the group.

10. The graph data compression method of claim 8, wherein a sum of a data size representing the third information and a data size representing the fourth information is equal to or greater than "$\log_2$ (a number of source vertices or a number of destination vertices in the piece)".

11. The graph data compression method of claim 10, further comprising determining the data sizes of the third information and the fourth information so that "a data size representing the fourth information*(a number of vertices in the piece+1)+a sum of data sizes of the first to third information*a number of data elements of compressed data" is minimized.

12. The graph data compression method of claim 8, wherein the storing comprises, for each piece, sequentially storing the first to fourth information.

13. A computing device comprising:

memories into which graph data is loaded; and processors configured to generate and store compressed data for the graph data stored in the memories by using a graph compression storage method, wherein the graph data compression storage method comprises:

dividing graph data comprising information about source vertices and destination vertices of edges into a plurality of pieces;

generating a plurality of compressed data obtained by compressing the plurality of pieces; and storing the plurality of compressed data, wherein the dividing comprises recursively dividing the graph data to generate a plurality of pieces having a size equal to or less than a predefined data size.

\* \* \* \* \*